(12) United States Patent
Best et al.

(10) Patent No.: US 7,490,081 B2
(45) Date of Patent: Feb. 10, 2009

(54) METHOD AND SYSTEM FOR AUTOMATIC IDENTIFICATION AND NOTIFICATION OF RELEVANT SOFTWARE DEFECTS

(75) Inventors: Steven Francis Best, Georgetown, TX (US); Janice Marie Girouard, Austin, TX (US); Raymond H. Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/334,659

(22) Filed: Jan. 18, 2006

(65) Prior Publication Data

US 2007/0168343 A1 Jul. 19, 2007

(51) Int. Cl.
G06F 7/00 (2006.01)
G06F 17/30 (2006.01)
G06F 11/00 (2006.01)
G06F 9/44 (2006.01)

(52) U.S. Cl. .............................. 707/3; 717/124; 714/25; 714/48

(58) Field of Classification Search ................. 707/3; 714/46, 25, 48; 717/124
See application file for complete search history.

(56) References Cited

U.S. PATENT DOCUMENTS

| | | | | |
|---|---|---|---|---|
| 5,553,278 A * | 9/1996 | Suzuki et al. | ................... | 707/2 |
| 5,737,734 A * | 4/1998 | Schultz | ........................... | 707/5 |
| 5,794,237 A * | 8/1998 | Gore, Jr. | ........................ | 707/5 |
| 6,029,258 A * | 2/2000 | Ahmad | ......................... | 714/46 |
| 6,167,358 A * | 12/2000 | Othmer et al. | .............. | 702/188 |
| 6,266,788 B1 * | 7/2001 | Othmer et al. | ................. | 714/38 |
| 6,546,388 B1 | 4/2003 | Edlund et al. | | |
| 6,629,267 B1 * | 9/2003 | Glerum et al. | ................ | 714/38 |
| 6,718,324 B2 | 4/2004 | Edlund et al. | | |
| 6,907,427 B2 | 6/2005 | Franz et al. | | |
| 2002/0112200 A1* | 8/2002 | Hines | ........................... | 714/38 |
| 2007/0168757 A1* | 7/2007 | Kobrosly et al. | .............. | 714/46 |

FOREIGN PATENT DOCUMENTS

WO    WO 02/29391 A3    4/2002

OTHER PUBLICATIONS

U.S. Appl. No. 10/155,697, filed May 24, 2002, Doganata et al.

* cited by examiner

*Primary Examiner*—James K Trujillo
*Assistant Examiner*—Jeffrey A Burke
(74) *Attorney, Agent, or Firm*—Duke W. Yee; Matthew W. Baca; Houda T. El-Jarrah

(57) ABSTRACT

A system for automatic identification and notification of relevant program defects. A defect report server opens a defect description in response to receiving the defect description from an end user. Then, the defect report server extracts each word and phrase contained within the program defect description. After extracting each word and phrase, the defect report server searches a plurality of defect databases for each extracted word and phrase. If an extracted word or phrase is found in a defect database, the defect report server calculates a word relevancy percentage for each of the extracted words or phrases found in the search. Finally, if the word relevancy percentage for each extracted word and phrase exceeds a threshold, the defect report server sends all relevant defects associated with each extracted word and phrase that exceeded the predetermined threshold to a defect owner.

12 Claims, 6 Drawing Sheets

400

| TITLE | DESCRIPTION | KERNEL | RELEVANCY PERCENTAGE |
|---|---|---|---|
| THIS PRODUCT | DEFECT REPORT SERVER'S DEFECT DATABASE | 2.6.3 | 100% |
| PRODUCT A | WIRELESS PRODUCT | 2.6.3 | 99% |
| PRODUCT B | TELECOM PRODUCT | 2.6.2 | 97% |
| LINUX KERNEL | ftp.kernel.org code | 2.6.3 | 85% |
| LINUX KERNEL | DEBIAN CODE | 2.4.25 | 70% |

402 — THIS PRODUCT row
404 — PRODUCT B row

| NEW DEFECT COMPONENT | EXISTING DEFECT COMPONENT | RELEVANCY PERCENTAGE |
|---|---|---|
| BASE SYSTEM | COMPILER AND LIBRARY | 25% |
| BASE SYSTEM | BASE SYSTEM 504 | 100% |
| BASE SYSTEM | DEVICE DRIVER | 50% |
| BASE SYSTEM | GENERAL TOOLS AND UTILITIES | 10% |
| COMPILER AND LIBRARY | BASE SYSTEM<br>DEVICE DRIVER 506<br>GENERAL TOOLS AND UTILITIES | 10%<br>5%<br>90% |
| DEVICE DRIVER | COMPILER AND LIBRARY<br>BASE SYSTEM | 100% |

*FIG. 5*

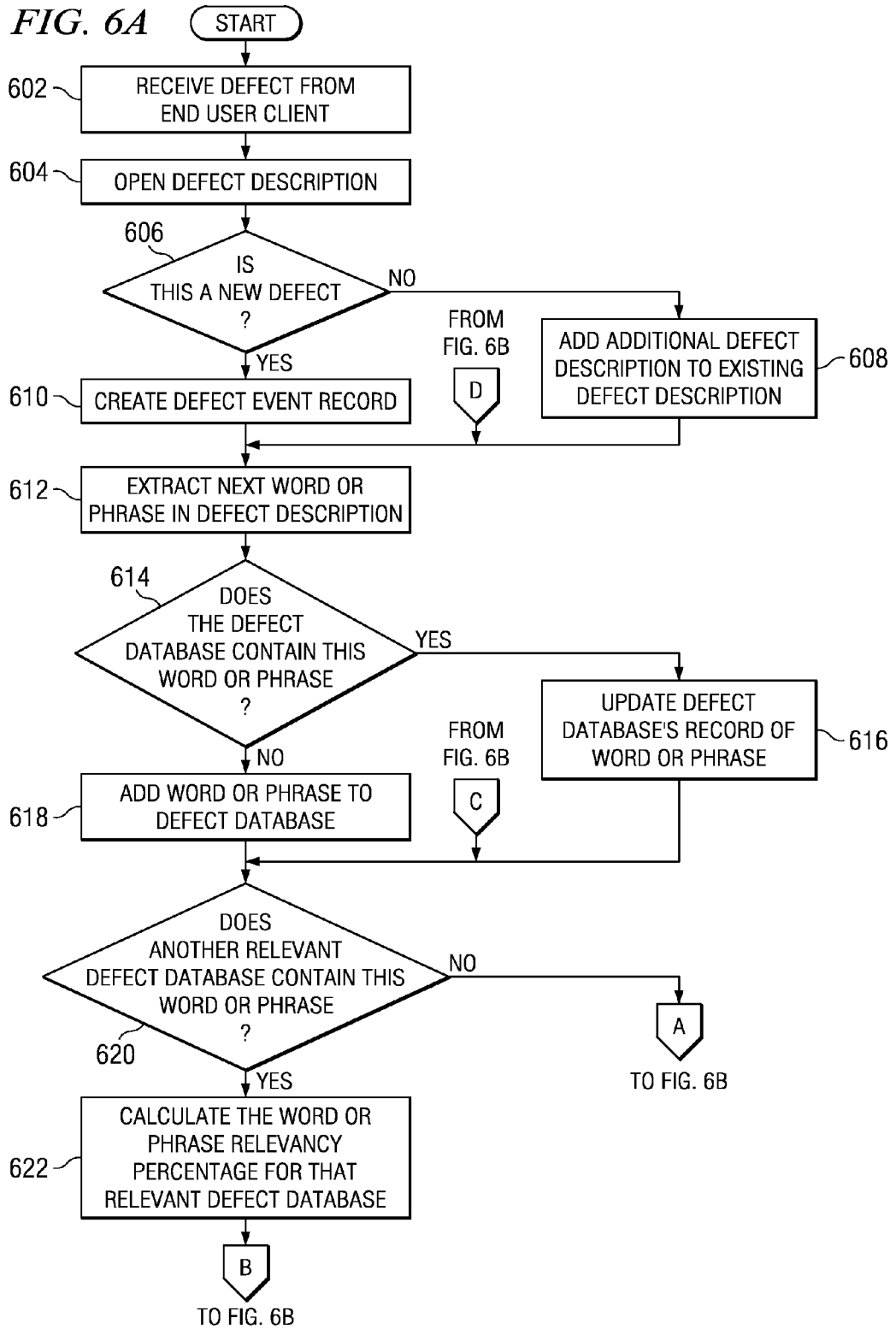

METHOD AND SYSTEM FOR AUTOMATIC IDENTIFICATION AND NOTIFICATION OF RELEVANT SOFTWARE DEFECTS

BACKGROUND OF THE INVENTION

1. Field of the Invention

The present invention relates generally to an improved data processing system. More specifically, the present invention is directed to a computer implemented method, apparatus, and computer usable program code for automatic identification and notification of relevant software defects.

2. Description of the Related Art

Computers utilize a master control program known as an operating system. The computer loads the operating system first when the computer is turned on. The operating system sets the standards for all programs that run in the computer. Programs communicate with the operating system for all user interfaces and file management operations. A program is a set of files that make up computer software that is used by an end user. Programs may include, for example, generic productivity software, such as spreadsheets, word processors, and database programs, and specialized software, such as e-mail, web browser, payroll, and accounting programs.

Programs consist of instructions and programming statements known as source code, which is written by a developer. Open source refers to software created by a development community rather than a single commercial vendor. Typically, volunteers from many organizations develop the source code of open source software, which is free and available to anyone who would like to use the software or modify the software for their own purposes. This allows an organization to add a feature itself rather than hope that the vendor of a proprietary product will implement its suggestion in a subsequent release.

Although open source software is technically free, many companies sell a distribution version of an open source operating system or application for a fee. The distribution combines the free source code along with proprietary development utilities and a technical support package.

Open source developers claim that a broad group of programmers produce a more useful and more bug-free product. The primary reason for this claim is that other developers are constantly reviewing the source code. This constant review of the original developer's source code by other developers is a natural byproduct of open source software. Peer review of programs is an important safeguard against poorly written source code. However, developers of closed source or proprietary software programs counter by claiming, "Too many cooks spoil the broth!" Closed source developers believe that having complete control over a program's development ultimately results in a better product.

Software development requires testing of a program that has been modified in order to ensure that bugs or defects have not been introduced into the source code. When program is enhanced, testing is usually only performed on the new feature or modification. However, adding source code to a program often introduces errors in other routines, causing many of the old and stable functions to be tested along with the new ones. Regression testing is one example of software testing utilized by program developers.

A bug or defect is a persistent error in the program's source code. The defect can be corrected by re-writing the program's source code. The defect may cause the program to produce invalid output or cause the program to crash or freeze-up. The defect or problem is either insufficient logic or erroneous logic.

Developers may record defects and modifications to a program's source code in a bug tracking software program. Defect or bug tracking software is software designed to assist developers manage software development. Bug tracking software programs are designed so that any member of a program's development team can access the defect database to log bugs and make appropriate changes to the source code. The bug tracking software program maintains a record of, for example, time of original bug identification, bug description, changes/fixes applied, as well as the developer who made the entry or change. As a result, the bug tracking software program allows the program's development team to effectively keep track of their own work on the program.

However, small development teams generally manage development environments for software programs. Even if the entire software program's development team is composed of a large number of developers, a modest team usually manages each component of the software package. Consequently, that component's development team must perform any modifications or changes for that particular component of the software package. Thus, each development team is effectively isolated from other development teams. If regression testing is performed and a defect is identified in a program, the development team working on the defective program may waste valuable time re-writing the source code because an existing solution to the identified defect may already be posted on a bug tracking system by a similar but separate development team working in a parallel development effort.

Therefore, it would be advantageous to have an improved method and system for automatic identification and notification of relevant software defects and possible fixes.

SUMMARY OF THE INVENTION

The present invention provides a computer implemented method, apparatus, and computer usable program code for automatic identification and notification of relevant software defects. An end user discovers a defect in a program on a client device. The end user sends a description of the defect over a network to a defect report server for tracking and analysis of the defect. The defect report server opens the defect description sent by the end user and extracts each word and phrase contained within the defect description.

After extracting each word and phrase, the defect report server determines if each extracted word and phrase is listed in a defect database contained within the defect report server. In addition, the defect report server searches other defect databases connected to the network for each extracted word and phrase. If the extracted words and/or phrases are found in one of the searched defect databases, the defect report server calculates a word relevancy percentage for each of the extracted words or phrases found in the search. Subsequently, if the word relevancy percentage for each extracted word and phrase exceeds a threshold, the defect report server sends all relevant defects associated with each extracted word and phrase that exceeded the predetermined threshold to a defect owner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary illustration of defect database relevancy rankings in accordance with an embodiment of the present invention;

FIG. 5 is an exemplary illustration of program component relevancy rankings in accordance with an embodiment of the present invention;

FIGS. 6A and 6B is a flowchart illustrating an exemplary process for automatic identification and notification of relevant software defects using a server in accordance with an embodiment of the present invention;

DETAILED DESCRIPTION OF THE PREFERRED EMBODIMENT

Figure 1:
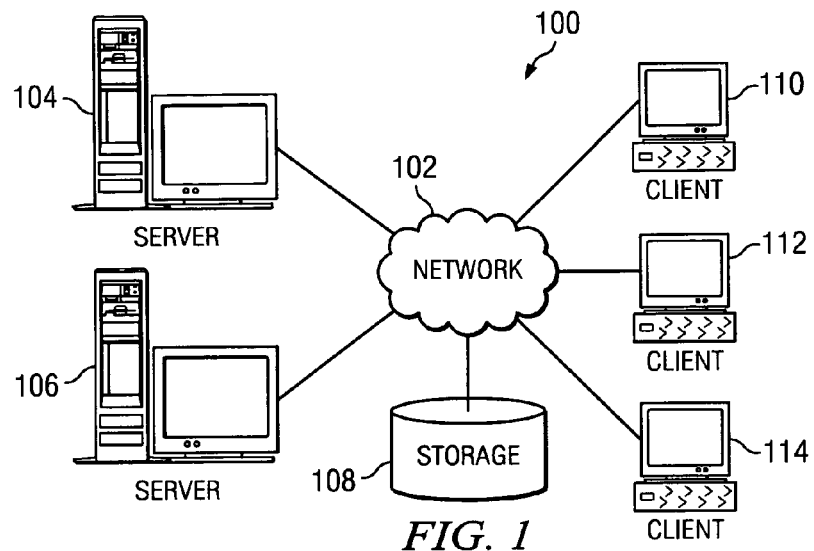
FIG. 1 is a pictorial representation of a network of data processing systems in which aspects of the present invention may be implemented.
Figure 2:
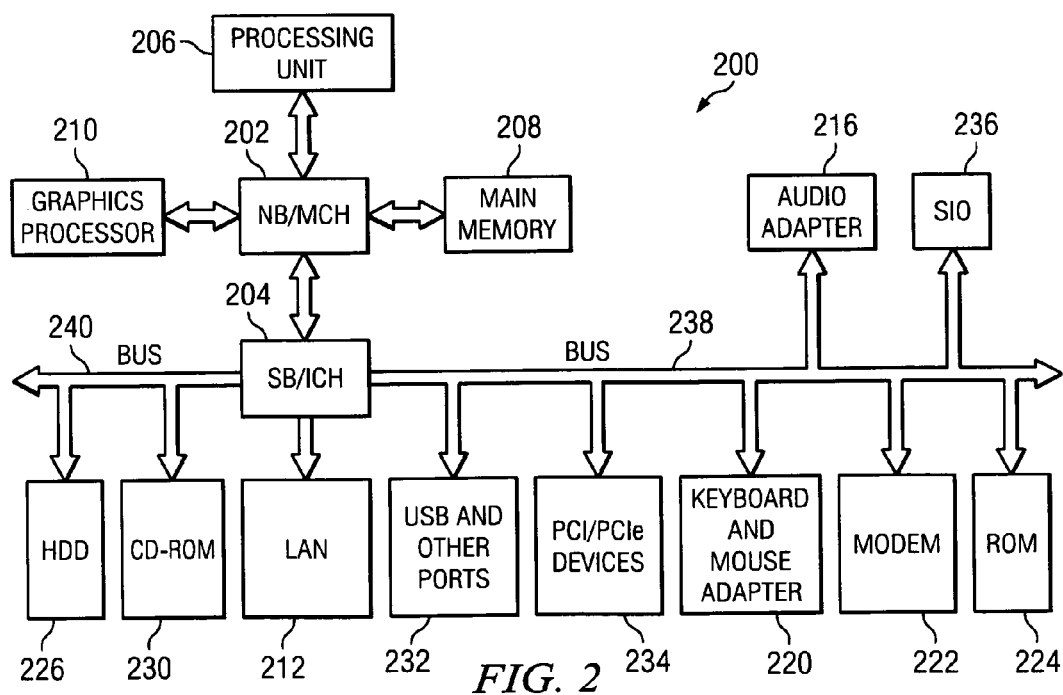
FIG. 2 is a block diagram of a data processing system in which aspects of the present invention may be implemented.

FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pseries® computer system, running the Advanced Interactive Executive (AIX®) operating system or the LINUX® operating system (eServer, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus, and computer useable program code for automatic identification and notification of relevant software defects. An end user sends a description of a defect that the end user has discovered in a program contained within a client device to a defect report server. The description of the defect, provided by the end user, contains information relating to the defect's effect on the program. The defect report server opens the defect description that was provided by the end user. The defect report server utilizing a bug tracking application extracts each word and phrase contained within the defect description.

Subsequent to extracting each word and phrase, the defect report server determines if each extracted word and phrase is listed in the defect report server's defect database. In addition, the defect report server searches other defect databases for each extracted word and phrase. If an extracted word or phrase is found in a defect database, the defect report server calculates a word relevancy percentage for each of the extracted words and phrases found in the search. Finally, if the word relevancy percentage for each extracted word and phrase exceeds a predetermined threshold, the defect report server sends all relevant defects associated with each extracted word and phrase that exceeded the predetermined threshold to a defect owner. The defect owner is a program developer that is responsible for making comment on the defect and for modifying the program source code in order to correct the program defect.

Benefits of embodiments of the present invention may be that a program development team's re-write time for a defective program's source code is reduced or eliminated because a fix has already been discovered by another development team for the defect. As a result, the program development team's productivity may be increased due to decreased re-write time. In addition, embodiments of the present invention may improve communication between development teams.

Consequently, software development costs may be reduced due to the increased communication between program development teams and the increased productivity caused by keeping track of software defect issues.

Figure 3:
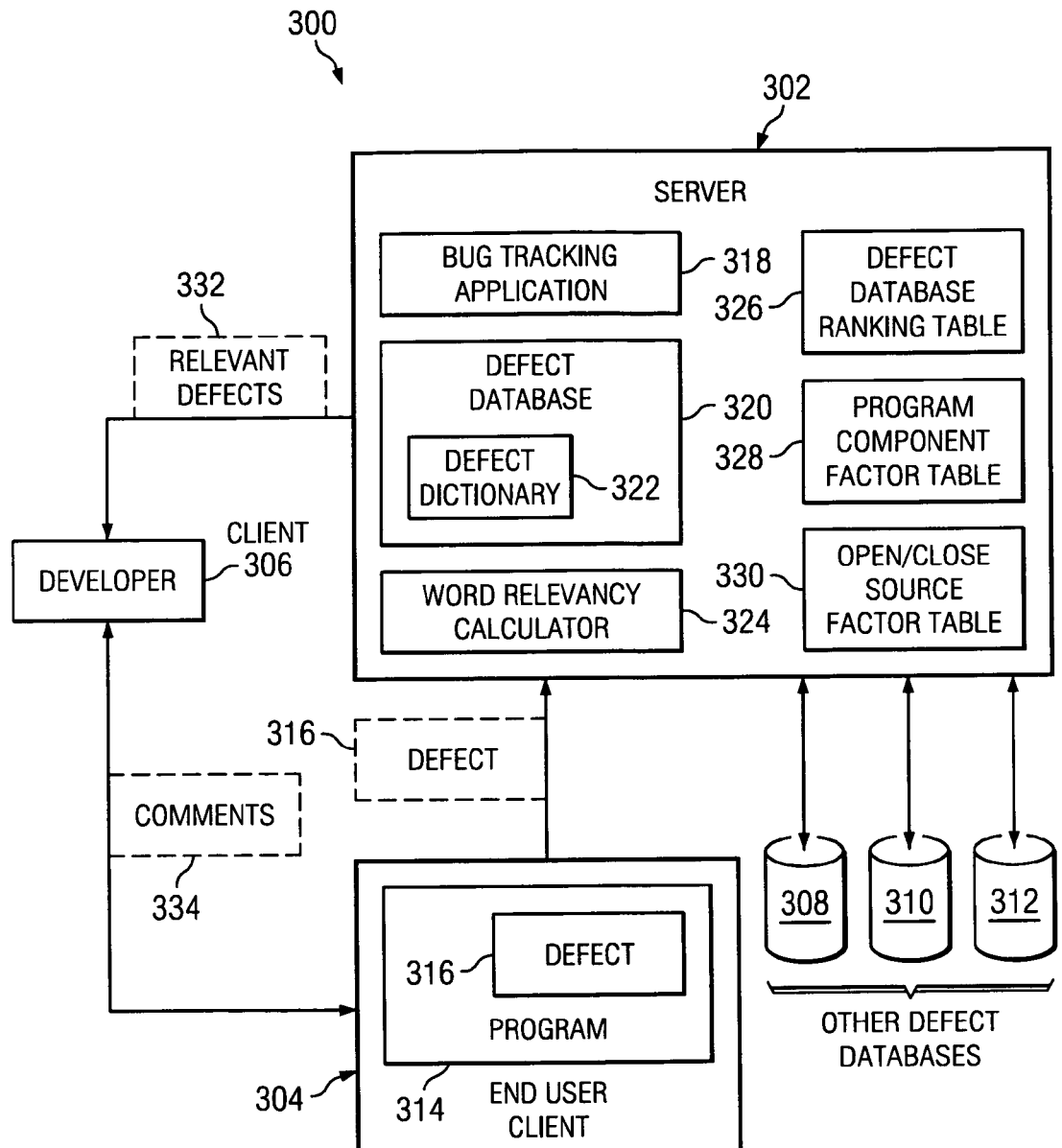
FIG. 3 is a block diagram illustrating the exchange of program defect information between a server and clients in accordance with an embodiment of the present invention.

Referring now to FIG. 3, a block diagram illustrating the exchange of program defect information between a server and clients is depicted in accordance with an embodiment of the present invention. Distributed data processing system 300, contains defect report server 302, end user client 304, developer client 306, and other defect databases 308, 310, and 312. For example, network data processing system 100 contains server 104, clients 110 and 112, and storage 108 in FIG. 1. However, distributed data processing system 300 is not restricted to the above listed architecture. Any architecture that may utilize embodiments of the present invention may be used. For example, defect report server 302 may not require other defect databases 308, 310, and 312. Defect report server 302 may store information contained in other defect databases 308, 310, and 312 in main memory, such as main memory 208 in FIG. 2. Distributed data processing system 300 is connected via a network, such as network 102 in FIG. 1.

End user client 304 contains program 314. Program 314 may be any open or closed source program available on the market today. Program 314 contains defect 316. Defect 316 may be any known or unknown software bug for program 314.

End user client 304 sends defect 316 over the network to defect report server 302. An end user in the context of this illustrated example may be a system administrator, a program developer, or a program customer. Defect report server 302 contains bug tracking application 318, defect database 320, word relevancy calculator 324, defect database ranking table 326, program component factor table 328, and open/closed source factor table 330.

Defect report server 302 receives defect 316 over the network from end user client 304. Defect report server 302 then directs defect 316 to bug tracking application 318. Defect report server 302 utilizes bug tracking application 318 to open defect 316 and create a program defect event record.

Defect report server 302 utilizes defect database 320 to maintain the program defect records created by bug tracking application 318. In addition, defect database 320 contains defect dictionary 322. Defect dictionary 322 contains one record for each word or phrase contained within defect database 320. The record for each word or phrase may include the percentage of defect descriptions that contain that particular word or phrase. Of course, the record for each word and phrase contained within defect dictionary 322 may include any information deemed relevant to embodiments of the present invention. Also, other defect databases 308, 310, and 312 each contain a defect dictionary as well.

Defect report server 302 uses word relevancy calculator 324 in order to calculate a word relevancy percentage for each word and/or phrase contained within a defect description sent to defect report server 302. The word relevancy percentage determines how relevant a word or phrase is in a program defect description. If the word relevancy percentage exceeds a predetermined threshold, then defect report server 302 considers the word or phrase a relevant defect.

Defect database ranking table 326 lists all relevant defect databases, which may contain information pertaining to defect 316. An end user creates defect database ranking table 326 by listing relevant defect databases, such as defect database 320 and other defect databases 308, 310, and 312. In addition, the end user assigns percentages to each defect database listed in defect database ranking table 326. These end user assigned percentages rank defect databases 308, 310, 312, and 320 according to their relevancy to defect 316. Word relevancy calculator 324 uses these defect database relevancy percentages for calculating the initial word relevancy percentage. It should be noted that the end user may edit defect database ranking table 326 by adding or deleting other relevant defect databases and changing the assigned ranking percentages for each listed defect database as needed.

Further, defect report server 302 may utilize open/closed source factor table 330 in calculating the initial word relevancy percentage. The end user creates the open/closed source factor table as well. The end user may deem open source software to be more relevant or reliable than closed source software, or vice-a-versa. Consequently, the end user assigns a relevancy percentage to open source software and a relevancy percentage to closed source software.

Also, the end user creates program component factor table 328. The end user assigns relevancy percentages to each of the components of a program that may contain defects associated with defect 316. Defect report server 302 may use program component factor table 328 in determining a final word relevancy percentage. It should be noted that the end user might add or delete program components listed in the factor table, as well as, change the assigned relevancy percentages as needed.

Subsequent to calculating a final word relevancy, defect report server 302 assigns a developer, such as developer client 306, as the defect owner if the final word relevancy calculation exceeds the predetermined threshold. As the defect owner, developer client 306 is responsible for making comments on and/or modifying defect 316. After assigning the defect owner, defect report server 302 sends relevant defects 332, which are associated with defect 316, to developer client 306 over the network. Subsequent to receiving relevant defects 332 from defect report server 302, developer client 306 may send comment 334 to end user client 304 over the network. Comment 334 contains comments provided by developer client 306 with regard to defect 316. Further, end user client 304 may respond to comment 332 by sending a more detailed description of defect 316 to developer client 306. Developer client 306 may then send the added defect description provided by end user client 304 to defect report server 302. In addition to the comments contained in comment 334, developer client 306 may send any known fixes for defect 316 to end user client 304.

Turning now to FIG. 4, an exemplary illustration of defect database relevancy rankings is shown in accordance with an embodiment of the present invention. A defect report server contains defect database relevancy ranking table 400, such as, for example, defect report server 302 contains defect database relevancy ranking table 326 in FIG. 3. An end user creates, and edits as is necessary, defect database relevancy ranking table 400.

Defect database relevancy ranking table 400 lists relevant defect databases with an associated relevancy percentage ranking. For example, in this depicted illustration, defect database relevancy ranking table 400 lists defect report server's defect database 402, such as defect database 320 in FIG. 3, with a 100% relevancy ranking. In other words, defect report server's defect database 402 is 100% relevant for all defect words and phrases found in defect report server's defect database 402. As a further example, defect database relevancy ranking table 400 lists Product B's telecom product defect database 404, such as other defect database 310 in FIG. 3, with a 97% relevancy ranking. A word relevancy calculator, such as word relevancy calculator 324 in FIG. 3, uses defect database relevancy ranking table 400 to calculate a defect word or phrase's initial word relevancy percentage.

With reference now to FIG. 5, an exemplary illustration of program component relevancy rankings is depicted in accordance with an embodiment of the present invention. A defect report server contains program component factor table 500, such as, for example, defect report server 302 contains program component factor table 328 in FIG. 3. An end user creates, and edits as is necessary, component relevancy ranking table 500.

Program component factor table 500 lists relevant components of a program with an associated relevancy percentage ranking. For example, in this depicted illustration an end user, such as end user 304 in FIG. 3, discovers a defect, such as defect 316 in FIG. 3, in base system component 502. An existing or previously discovered defect found in base system component 504 is 100% relevant to the defect discovered in base system component 502. However, an existing defect found in device driver component 506 is only 5% relevant to a defect discovered in compiler/library component 508. A word relevancy calculator, such as word relevancy calculator 324 in FIG. 3, may use program component factor table 500 as a factor to be taken into consideration while calculating the final word or phrase relevancy percentage.

Figure 6B:
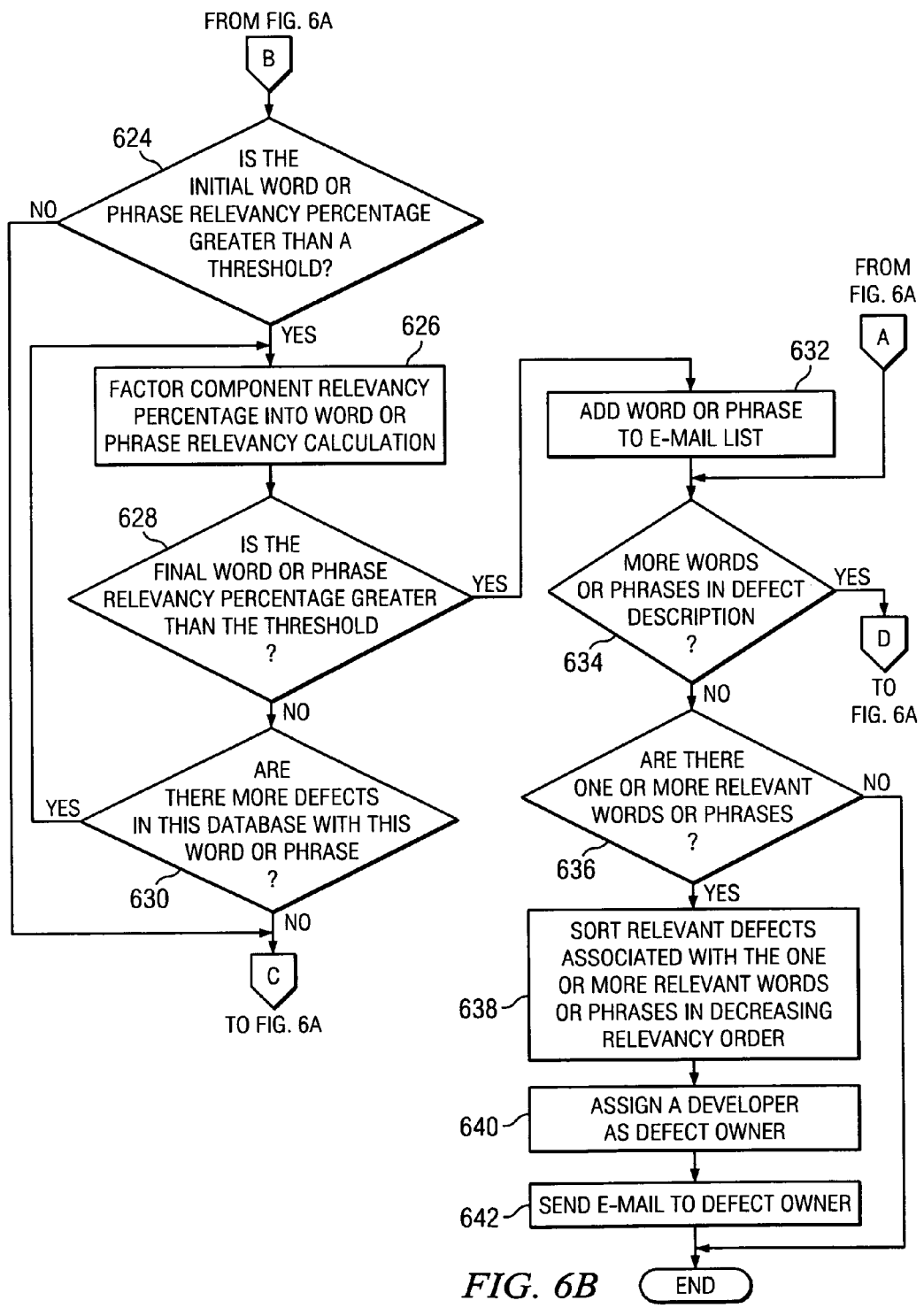

Referring now to FIGS. 6A and 6B, a flowchart is shown illustrating an exemplary process for automatic identification and notification of relevant software defects using a server in accordance with an embodiment of the present invention. The process depicted in FIG. 6 may be implemented in a defect report server, such as defect report server 302 in FIG. 3.

The process begins when a defect report server, such as defect report server 302 in FIG. 3, receives a program defect, such as defect 316 in FIG. 3, from an end user using a client device, such as end user client 304 in FIG. 3, over a network, such as network 102 in FIG. 1 (step 602). After the defect report server receives the program defect, the defect report server routes the program defect to a bug tracking application, such as bug tracking application 318 in FIG. 3. The bug tracking application opens the program defect (step 604) and makes a determination as to whether this is a newly reported defect (step 606).

If this is not a newly reported defect, no output of step 606, then the bug tracking application adds the additional defect description to the existing defect description for the reported defect (step 608) and the process proceeds to step 612 thereafter. If this is a newly reported defect, yes output of step 606, then the bug tracking application creates a defect event record (step 610) and extracts each word and/or phrase of the defect description in sequential order for analysis (step 612).

Subsequent to extracting a word or phrase in the defect description in step 612, a determination is made as to whether the defect report server's defect dictionary, such as defect dictionary 322 in FIG. 3, contains the word or phrase (step 614). If the defect dictionary does contain the word or phrase, yes output of step 614, then the defect report server uses the bug tracking application to update the word or phrase's record in the defect dictionary (step 616) and the process proceeds to step 620 thereafter. If the defect dictionary does not contain the word or phrase, no output of step 614, then the defect report server uses the bug tracking application to add the word or phrase to the defect dictionary (step 618).

After the defect report server adds the word or phrase to the defect dictionary in step 618, a determination is made as to whether another relevant defect database, such as defect database 308 in FIG. 3, contains the word or phrase (step 620). If another defect database does not contain the word or phrase, no output of step 620, then the process proceeds to step 634. If another defect database contains the word or phrase, yes output of step 620, then the defect report server uses a word relevancy calculator, such as word relevancy calculator 324 in FIG. 3, to calculate the word relevancy percentage for the word or phrase contained in that other defect database (step 622).

The more end users use a word or phrase in defect descriptions, the less relevant that word or phrase is as a defect word or phrase. The defect dictionary contains a record for each word or phrase contained within the defect dictionary and the record of each word or phrase includes the percentage of defect descriptions that contain that particular word or phrase. Consequently, the basic word relevancy for that particular word or phrase may be obtained by subtracting the percentage of defect descriptions that contain that word or phrase from 100%.

By way of illustration, the word "this" may be used, for example, in 98% of defect descriptions according to the defect dictionary record for the word "this." Therefore, the word relevancy calculator subtracts 98% from 100% to arrive at a 2% basic relevancy percentage for the word "this." Because the word "this" is often used in defect descriptions, "this" is not very relevant by itself as a defect word.

However, embodiments of the present invention may take into account the context of the word or phrase being analyzed in calculating a basic word or phrase relevancy percentage. Context of the word or phrase being analyzed may mean, for example, how the analyzed word or phrase relates to other words in the same sentence or paragraph. Relationship to other words may mean, for example, proximity of location or how close the words or phrases appear to one another in the same sentence and/or paragraph. For example, the bug tracking application may track how many defect descriptions use the word "this" next to other relevant groups of words and/or phrases. The word relevancy calculator may later access this word context information for the purpose of modifying the basic relevancy percentage of the analyzed word or phrase.

Further, the word relevancy calculator may take into account a defect database relevancy percentage while calculating an initial word relevancy percentage for each word or phrase contained in the defect description. In other words, embodiments of the present invention may consider the defect database, which contains the record of the defect word or phrase, an important factor in calculating relevancy. The end user creates, and edits as needed, the defect database ranking table, which contains the defect database relevancy percentage for each defect database listed in the table. The word relevancy calculator multiplies the basic word or phrase relevancy percentage by the defect database relevancy percentage in order to obtain the initial word or phrase relevancy percentage. By way of illustration, if the defect database that contains the word "this," has, for example, a 97% relevancy percentage, then the word relevancy calculator multiplies the 2% basic word relevancy percentage for the word "this" by the 97% defect database relevancy percentage to produce a 19% initial word relevancy percentage for the word "this."

As a further illustration, if the phrase "ignore errors" is only found in 1% of defect descriptions, then the basic phrase relevancy for "ignore errors" is 99%. The word relevancy calculator calculates this percentage by subtracting 1% from 100% to obtain the 99% basic phrase relevancy for "ignore errors." Also, the phrase "ignore errors" is located, for example, in the same defect database as the word "this." As a result, the defect database relevancy percentage remains at 97%. Hence, "ignore errors" has an initial phrase relevancy of 96%. The word relevancy calculator obtains this percentage by multiplying the 99% basic phrase relevancy percentage by the 97% defect database relevancy percentage to produce the 96% initial phrase relevancy percentage for "ignore errors." Thus, the phrase "ignore errors" is 96% relevant in this exemplary illustration.

Additionally, the defect report server may use an open source relevancy percentage and a closed source relevancy percentage as another factor in calculating the initial word relevancy percentage. The end user creates, and edits as needed, an open/closed source factor table, such as open/closed source factor table 330 in FIG. 3, which contains the open and closed source relevancy percentages. The end user may, for example, assign a 50% relevancy percentage to open source and a 90% relevancy percentage to closed source. The word relevancy calculator may multiply the initial word or phrase relevancy percentage by the open or closed source relevancy percentage in order to modify the initial word relevancy percentage.

By way of illustration, if "ignore errors" is located in closed source software, the word relevancy calculator factors in the exemplary 90% closed source relevancy percentage, which results in an 86% modified initial word relevancy percentage. The word relevancy calculator obtains this percentage by multiplying the 96% "ignore errors" initial phrase relevancy percentage, which is taken from the example above, by the exemplary 90% closed source relevancy percentage to produce the 86% modified initial word relevancy percentage.

Subsequent to the word relevancy calculator calculating the initial word relevancy percentage for the word or phrase in step 622, a determination is made as to whether the initial word or phrase relevancy percentage is greater than a predetermined threshold (step 624). The end user may determine the word relevancy percentage threshold or a default setting may be used. For example, the end user may set the word relevancy percentage threshold at 75%. In other words, the defect report server considers a word or phrase with a 75% or greater word or phrase relevancy percentage as relevant. Of course, any threshold percentage may be utilized by embodiments of the present invention. By way of illustration, using the 86% initial phrase relevancy example above for "ignore errors," and using the exemplary 75% word relevancy percentage threshold, the defect report server initially considers "ignore errors" as a relevant defect phrase.

If the initial word or phrase relevancy percentage is not greater than the predetermined threshold, no output of step 624, then the process returns to step 620. If the initial word or phase relevancy percentage is greater than the predetermined threshold, yes output of step 624, then the defect report server uses a program component factor table, such as program component factor table 328 in FIG. 3, in order to factor in a program component relevancy percentage into a final word relevancy percentage (step 626).

By way of illustration, if the end user discovers the defect in a base system component and the defect dictionary contains an existing defect that was found in a base system component as well, the end user may, for example, assign the existing base system program component with a 100% relevancy percentage. Using the "ignore errors" example above, if the end user discovers the "ignore errors" defect phrase in a base system component of the program and the defect database's dictionary contains an existing "ignore errors" defect phrase record from a base system component as well, the final phrase relevancy percentage for "ignore errors" is 86%. The word relevancy calculator obtains this percentage by multiplying the 86% initial phrase relevancy percentage by the 100% program component relevancy percentage to produce the 86% final phrase relevancy percentage for "ignore errors." Thus, "ignore errors" is 86% relevant as a defect phrase.

Moreover, the end user may program the word relevancy calculator to, for example, track a program component relevancy range. The word relevancy calculator may use the program component relevancy range for the purpose of assisting the word relevancy calculator in factoring in the program component relevancy percentage for the final word or phrase relevancy percentage calculation. For example, the word relevancy calculator may track release numbers, such as 2.4.0, 2.4.25, and 2.6.3, for all programs recorded in the searched defect databases. The end user may determine that release numbers 2.4.0 to 2.9.99 for a particular program are relevant for a particular defect. Consequently, the end user may set a program component relevancy percentage for all program components contained within release numbers 2.4.0 to 2.9.99. Thus, the end user creates, and edits as needed, the program component relevancy range for the word relevancy calculator. Subsequently, the word relevancy calculator uses the program component relevancy range in order to determine the proper relevancy percentage to apply to a particular program component that has a particular program release number.

After the program component relevancy percentage is factored into the final word or phrase relevancy percentage in step 626, a determination is made as to whether the final word or phrase relevancy percentage is greater than a predetermined threshold (step 628). It should be noted that the predetermined threshold for the final word or phrase relevancy percentage might be the same as, or different from, the initial word or phrase relevancy percentage threshold. In addition, a default final word or phrase relevancy percentage threshold setting may be utilized. By way of illustration, using the 86% final phrase relevancy example above for "ignore errors," and using an exemplary 85% phrase relevancy percentage threshold, the defect report server considers "ignore errors" as a relevant phrase.

If the final word or phrase relevancy percentage is not greater than the predetermined threshold, no output of step 628, then another determination is made as to whether this defect database contains more defects with this word or phrase (step 630). If this database does not contain more defects with this word or phrase, no output of step 630, then the process returns to step 620. If this database does contain more defects with this word or phrase, yes output of step 630, then the process returns to step 626.

If the final word or phrase relevancy percentage is greater than the predetermined threshold, yes output of step 628, then the defect report server uses the bug tracking application to add the word or phrase to an e-mail list (step 632). Subsequent to adding the word or phrase to the e-mail list in step 632, a determination is made as to whether the defect description contains more words or phrases (step 634). If the defect description does contain more words or phrases, yes output of step 634, then the process returns to step 612 in order to extract the next sequential word or phrase in the defect description. If the defect description does not contain more words or phrases, no output of step 634, then another determination is made as to whether one or more relevant words or phrases exist in the defect description (step 636). If one or more relevant words or phrases do not exist in the defect description, no output of step 636, then the process terminates thereafter.

If one or more relevant words or phrases do exist in the defect description, yes output of step 636, then the defect report server utilizes the bug tracking application to sort the relevant words and/or phrases in decreasing relevancy percentage order (step 638). After sorting the relevant words and/or phrases in decreasing relevancy percentage order in step 638, the defect report server assigns a developer, such as developer client 306 in FIG. 3, as the defect owner (step 640). Subsequent to assigning the developer as the defect owner in step 640, the defect report server sends the defect owner an e-mail containing all relevant defects associated with the relevant words and/or phrases, such as relevant defects 332 in FIG. 3 (step 642). By way of illustration, because the defect report server considers "ignore errors" as a relevant phrase in the example above, the defect report server sends all relevant defects associated with the "ignore errors" phrase to the defect owner. The process terminates thereafter.

Figure 7:
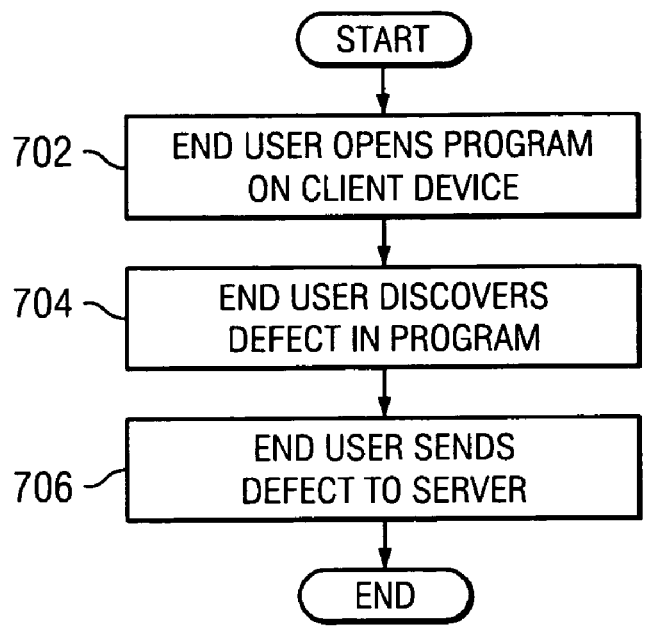
FIG. 7 is a flowchart illustrating an exemplary process for an end user using a client device to send a defect to a defect report server in accordance with an embodiment of the present invention.

Turning now to FIG. 7, a flowchart illustrating an exemplary process for an end user using a client device to send a defect to a defect report server is depicted in accordance with an embodiment of the present invention. The process depicted in FIG. 7 may be implemented in a client device, such as end user client 304 in FIG. 3.

The process begins when an end user opens a program, such as program 314 in FIG. 3, on a client device (step 702). After opening the program in step 702, the end user discovers a defect, such as defect 316 in FIG. 3, in the program (step 704). Subsequent to discovering the defect in step 704, the end user sends the defect to a defect report server, such as defect report server 302 in FIG. 3 (step 706). The process terminates thereafter.

Figure 8:
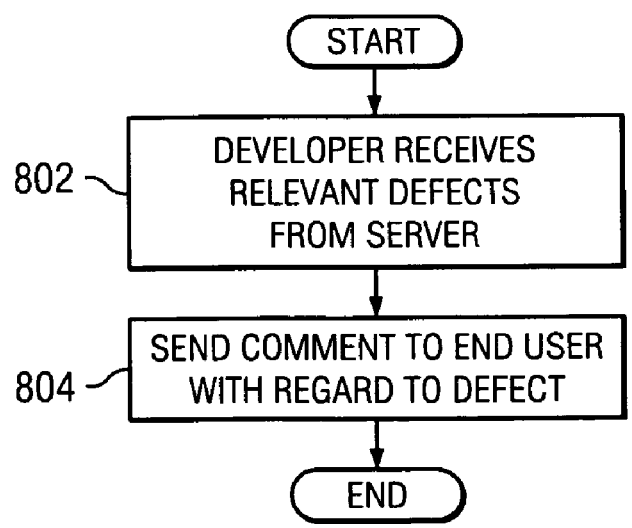
FIG. 8 is a flowchart illustrating an exemplary process for a developer using a client device to receive relevant defects from a defect report server.

With reference now to FIG. 8, a flowchart is shown illustrating an exemplary process for a developer using a client device to receive relevant defects from a defect report server in accordance with an embodiment of the present invention. The process depicted in FIG. 8 may be implemented in a client device, such as developer client 306 in FIG. 3.

The process begins when a developer receives an e-mail on a client device from a defect report server, such as defect report server 302 in FIG. 3, which contains all relevant defects associated with a program defect, such as defect 316 in FIG. 3 (step 802). After receiving the e-mail containing the relevant defects from the defect report server in step 802, the developer using the client device sends a comment regarding the program defect, such as comment 332 in FIG. 3, to the end user that reported the defect, such as end user client 304 in FIG. 3 (step 804). The process terminates thereafter.

Thus, embodiments of the present invention provide a computer implemented method, apparatus, and computer usable program code for automatic identification and notification of relevant software defects. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatic identification and notification of relevant program defects, the computer implemented method comprising:
   receiving a program defect description from a user of a defect database;
   responsive to determining that the program defect description is new, creating an event record of the program defect description;
   extracting each word and each phrase of the program defect description in sequential order from the program defect description, wherein the each phrase comprises at least two words;
   determining whether the each word and the each phrase are included in a defect dictionary on the defect database;
   responsive to locating the each word and each phrase in the defect dictionary, updating the defect dictionary to include the each word and the each phrase from the program defect description;
   responsive to the absence of the each word and the each phrase in the defect dictionary, adding the each word and the each phrase to the defect dictionary;
   searching a plurality of defect databases for the each word and the each phrase;
   responsive to locating at least one defect database among the plurality of defect databases containing the each word and the each phrase, calculating a final word relevancy percentage for the each word and the each phrase, wherein calculating a final word relevancy percentage for the each word and the each phrase further comprises:
      calculating an initial word relevancy percentage for the each word and the each phrase within the program description, wherein determining the initial word relevancy percentage comprises using a record maintained in the defect dictionary, wherein the record indicates relevancy of the each word and the phrase, wherein determining the relevancy is comprises determining how often users use the each word and the each phrase in the defect descriptions;
   receiving a defect database relevancy ranking table, wherein the defect database relevancy ranking table lists each defect database in the plurality of defect databases, wherein the each defect database listed is associated with a relevancy percentage assigned by the user;
   receiving a program component factor table, wherein the user assigns relevancy percentages to each program component based on relevancy to the program defect description, wherein the each program component comprises a set of components in a program;
   receiving the source factor percentages assigned by the user to the defect databases, wherein the source factor percentages are percentages assigned by the user depending on whether the defect databases are open source databases or closed source databases;
   calculating a final word relevancy percentage for the each word and the each phrase using the initial word relevancy percentage, the defect database relevancy ranking table, the program component factor table, and the source factor percentages in the calculation of the final word relevancy percentage for the each word and the each phrase; and
   sending relevant defects and the final word relevancy percentage to a program developer to repair the program, wherein the program developer utilizes the relevant defects.

2. The computer implemented method of claim 1, further comprising:
   sorting the each word and the each phrase that exceeds the threshold in decreasing relevancy order; and
   sending relevant program defects associated with the each word and the each phrase that exceeds the threshold to the program developer in decreasing relevancy order.

3. The computer implemented method of claim 1, further comprising:
   searching a bug tracking application for context information associated with the each word and the each phrase to form word and phrase context information, wherein the word and phrase context information is used to modify a basic word relevancy percentage for the each word and the each phrase.

4. A computer implemented method of claim 1, wherein the final word relevancy percentage takes into account a program component relevancy range.

5. The computer implemented method of claim 1, wherein the plurality of defect databases each include a defect dictionary.

6. A data processing system comprising:
   a bus system;
   a storage device connected to the bus system, wherein the storage device includes a set of instructions; and
   a processing unit connected to the bus system, wherein the processing unit executes the set of instructions to receive a program defect description from a user of a defect database;
   to create an event record of the program defect description, responsive to determining that the defect description is new;

to extract each word and each phrase of the program defect description in sequential order from the program defect description, wherein the each phrase comprises at least two words;

to determine whether the each word and the each phrase are included in a defect dictionary on the defect database;

to update the defect dictionary to include the each word and the each phrase from the program defect description, responsive to locating the each word and the each phrase in the defect dictionary;

to add the each word and the each phrase to the defect dictionary, responsive to the absence of the each word and the each phrase in the defect dictionary;

to search a plurality of defect databases for the extracted each word and the each extracted phrase;

to calculate a final word relevancy percentage for the each word and the each phrase, wherein calculating the final word relevancy percentage for the each word and the each phrase comprises: calculating an initial word relevancy percentage for the each word and the each phrase within the program defect description, wherein determining the initial word relevancy percentage comprises using a record maintained in the defect dictionary, wherein the record indicates relevancy of the each word and the each phrase, wherein determining the relevancy comprises:

determining how often users use the each word and the each phrase in the program defect description, receiving a defect database relevance ranking table, wherein the defect database relevancy ranking table lists each defect database in the plurality of defect databases;

wherein each defect database listed is associated with a relevancy percentage assigned by the user, receiving a program component factor table, wherein the user assigns relevancy percentages to teach program component based on relevancy to the program defect description;

wherein the each program component comprises a set of components in a program, receiving a source factor percentage assigned by the user to the defect databases;

wherein the source factor percentages are percentages assigned depending on whether the defect databases are open source databases or closed source databases;

to calculate a final word relevancy percentage for the each word and the each extracted phrase using the initial word relevancy percentage, the defect database relevancy ranking table, the program component factor table, and the source factor percentages in the calculation of the final word relevancy percentage for the each word and the each phrase; and to send relevant defects and the final word relevancy percentage to a program developer to repair the program defect, wherein the program developer utilizes the relevant defects.

7. The data processing system of claim 6, wherein the set of instructions are implemented in a server, and wherein the server is a defect report server.

8. The data processing system of claim 6, wherein the user sends the program defect description via a client device.

9. A computer program product for automatic identification and notification of relevant program defects, the computer program product comprising:

a recordable-type computer usable storage medium having computer usable program code embodied therein, the computer usable storage medium comprising:

computer usable program code configured to receive a program defect description from a user of a defect database;

computer useable program code configured to responsive to determining that the program defect description is new, creating an event record of the program defect description;

computer usable program code configured to extract each word and each phrase of the program defect description in sequential order from the program defect description, wherein the each phrase comprises at least two words;

computer usable program code for determining whether the each word and the each phrase are included in a defect dictionary on the defect database;

computer usable program code for responsive to locating the each word and the each phrase in the defect dictionary, updating the defect dictionary to include the each word and the each phrase from the program defect description;

computer usable program code for responsive to the absence of the each word and the each phrase in the defect dictionary, adding the each word and the each phrase to the defect dictionary;

computer usable program code configured to search a plurality of defect databases for the each extracted word and the each extracted phrase;

computer usable program code configured to responsive to locating at least one defect database among the plurality of defect databases containing the each word and the each phrase, calculating a final word relevancy percentage for the each word and the each phrase, wherein calculating the final word relevancy percentage for the each word and the each phrase further comprises:

computer usable program code configured to calculate an initial word relevancy percentage for the each word and the each phrase within the program defect description, wherein determining the initial word relevancy percentage comprises using a record maintained in the defect dictionary, wherein the record indicates relevancy of the each word and the each phrase, wherein determining the relevancy comprises determining how often users use the each word and the each phrase in the defect descriptions;

computer usable program code configured to receive a defect database relevancy ranking table, wherein the defect database relevancy ranking table lists each defect database in the plurality of defect databases, wherein the each defect database listed is associated with a relevancy percentage assigned by the user;

computer usable program code configured to receive a program component factor table, wherein the user assigns relevancy percentages to each program component based on relevancy to the program defect description, wherein the each program component comprises a set of components in a program;

computer usable program code configured to receive source factor percentages assigned by the user to the defect databases, wherein the source factor percentages are percentages assigned by the user depending on whether the defect databases are open source databases or closed source databases;

computer usable program code configured to calculate a final word relevancy percentage for the each extracted word and the each phrase using the initial word relevancy percentage, the defect database relevancy ranking table, the program component factor table, and the source factor percentages in the calculation of the final word relevancy percentage for the each word and the each phrase; and computer usable program code for sending relevant defects and the final word relevancy percentage to a program developer to repair the program defect, wherein the program developer utilizes the relevant defects.

10. The computer program product of claim 9, further comprising:

computer usable program code configured to sort the each word and the each phrase that exceeds the threshold in decreasing relevancy order; and computer usable program code configured to send relevant program defects associated with the each word and the each phrase that exceeds the threshold to the program developer in decreasing relevancy order.

11. The computer program product of claim 9, further comprising:

computer usable program code configured to search a bug tracking application for context information associated with the each word and the each phrase to form word and phrase context information, wherein the word and phrase context information is used to modify a basic word relevancy percentage for the each word and the each phrase.

12. The computer program product of claim 9, wherein the final word relevancy percentage takes into account a program component relevancy range.

* * * * *